(12) United States Patent
Fietzek et al.

(10) Patent No.: US 9,174,188 B2
(45) Date of Patent: *Nov. 3, 2015

(54) LIGHTWEIGHT, INTRINSICALLY SAFE OZONE ELECTRODE

(71) Applicant: XYLEM IP Holdings LLC, White Plains, NY (US)

(72) Inventors: Reiner Fietzek, Herford (DE); Ernst Martin Billing, Bielefeld (DE); Ralf Fiekens, Stukenbrock (DE)

(73) Assignee: XYLEM IP Holdings LLC, White Plains, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/323,395

(22) Filed: Jul. 3, 2014

(65) Prior Publication Data

US 2014/0314633 A1 Oct. 23, 2014

Related U.S. Application Data

(63) Continuation of application No. 13/980,482, filed as application No. PCT/EP2012/000153 on Jan. 16, 2012, now Pat. No. 8,808,634.

(30) Foreign Application Priority Data

Jan. 19, 2011 (DE) .......................... 10 2011 008 947

(51) Int. Cl.
*B01J 19/08* (2006.01)
*C01B 13/11* (2006.01)

(52) U.S. Cl.
CPC ............... *B01J 19/088* (2013.01); *C01B 13/11* (2013.01); *C01B 13/115* (2013.01); *C01B 2201/14* (2013.01); *C01B 2201/22* (2013.01); *C01B 2201/24* (2013.01); *C01B 2201/32* (2013.01)

(58) Field of Classification Search
CPC .... B01J 19/088; C01B 13/11; C01B 2201/14; C01B 2201/22; C01B 2201/24; C01B 2201/32; C01B 13/115
USPC ................................................ 422/186–186.3
IPC ........................................................ C01B 13/11
See application file for complete search history.

(56) References Cited

U.S. PATENT DOCUMENTS

| 5,409,673 | A | * | 4/1995 | Mausgrover et al. .... 422/186.07 |
| 6,106,788 | A | | 8/2000 | Rau et al. |
| 6,833,121 | B2 | | 12/2004 | Cooper et al. |
| 7,560,080 | B2 | | 7/2009 | Billing et al. |
| 2008/0056934 | A1 | * | 3/2008 | Tsui ................................. 422/2 |

FOREIGN PATENT DOCUMENTS

| EP | 0 461 752 A1 | 12/1991 |
| EP | 0 789 666 B1 | 8/1997 |

(Continued)

OTHER PUBLICATIONS

International Search Report, dated Apr. 26, 2012, corresponding to International Patent Application No. PCT/EP2012/000153, filed Jan. 16, 2012.

(Continued)

*Primary Examiner* — Kishor Mayekar
(74) *Attorney, Agent, or Firm* — RatnerPrestia

(57) ABSTRACT

An electrode arrangement for an ozone generator includes a tubular dielectric which concentrically encloses a rod at a distance therefrom, and a filler material provided in an interstice between the tubular dielectric and the rod.

12 Claims, 1 Drawing Sheet

(56) References Cited

FOREIGN PATENT DOCUMENTS

| | | | |
|---|---|---|---|
| JP | 58-114727 | * | 7/1983 |
| JP | S6451303 A | | 2/1989 |
| WO | WO 93/16001 | | 8/1993 |
| WO | WO02/096798 A1 | | 12/2002 |

OTHER PUBLICATIONS

International Preliminary Report on Patentability, dated Jul. 23, 2013, corresponding to International Patent Application No. PCT/EP2012/000153, filed Jan. 16, 2012.

* cited by examiner

LIGHTWEIGHT, INTRINSICALLY SAFE OZONE ELECTRODE

CROSS-REFERENCE TO RELATED APPLICATIONS

This is a continuation patent application of U.S. patent application Ser. No. 13/980,482, filed Aug. 2, 2013, which is a U.S. National Phase Patent Application of PCT International Patent Application Number PCT/EP2012/000153, filed Jan. 16, 2012, which claims priority benefit of German Patent Application No. 10 2011 008 947.0, filed Jan. 19, 2011, each of which is incorporated herein by reference in its entirety.

FIELD OF THE INVENTION

The present invention relates to a device for generating ozone.

BACKGROUND OF THE INVENTION

Ozone is a powerful oxidisation agent for organic substances and inorganic compounds containing elements with several oxidisation degrees. There are diverse areas of application for ozone, one of which is its use in water treatment.

Technically, ozone can be produced by passing a silent electrical discharge through gas containing oxygen. Silent electrical discharge is, in contrast to spark discharge, to be understood as a stable plasma discharge or corona discharge. Molecular oxygen is dissociated into atomic oxygen. The reactive oxygen atoms subsequently attach themselves to molecular oxygen in an exothermic reaction and form triatomic molecules, i.e. ozone. The ozone yield depends inter alia on the electric field strength and operating temperature.

Moreover, a dependence on gas composition has been observed. The dependence on operating temperature rests on the fact that ozone decomposes more rapidly again into molecular oxygen at higher temperatures and, due to the resulting displacement of the equilibrium between the originating and disintegrating ozone, the available ozone concentration is less.

Higher field strengths, which likewise lead to increased ozone yield, can be achieved inter alia by reducing the gap and by selecting dielectrics with higher relative dielectricity constants. Doped glass or ceramic materials are used for dielectrics with higher relative dielectricity constants. However, dielectrics made of ceramic materials have the disadvantage that they are non-homogenous and, in practice, may have lower dielectric breakdown strength than homogenous materials. Furthermore, high-grade ceramic materials in the form of moulds with high dimensional stability are extremely expensive and thinner dielectrics increase the risk of a dielectric breakdown.

Limits have been established for reducing the gap due to unpreventable manufacturing tolerances along with bending and buckling due to mechanical stresses and heat expansion in operation. Since an increase in field strength by reducing the gap width and by using dielectrics with high dielectricity constants leads to a significant increase in manufacturing costs, financial limits have been established here.

A device of the type referred to above is known from WO 93/16001. The electrically and thermally conductive, gas-permeable arrangement is formed from a number of helical coils, which form a series of curved surfaces, between which and the adjacent electrode an electrical corona discharge is formed. The previously known device is substantially cylindrically symmetrical. The arrangement together with a conductor resting inside it forms the inner electrode in all embodiments. Said conductor is a wire or tube and is arranged and centred mechanically on the tubular dielectric. The arrangement per se is a filler that has no centring task.

A device of the type referred to above is known from JP 1-51303, which is likewise substantially cylindrically symmetrical. Two tubes are held against each other centrally by peripheral spacers. The annular gap between said spacers is filled by the arrangement which is described as filler material. This is arranged in an irregular manner, which is inevitably the case with a filler material, and it does not have the task of mechanically centring the inner tube inside the outer tube.

In both cited documents, a metallic conductor is provided in the middle of the electrode arrangement as a support for the filler material, which also serves as an electrical contact with the filler material.

The closest prior art is disclosed in EP 0 789 666 B1. Said document describes ozone generators with a directly cooled external electrode and a rod-shaped metallic inner electrode with a dielectric resting between them. A knitted wire mesh is arranged between the electrodes and the dielectric, which improves firstly the thermal transfer from the feed gas to the cooled electrodes, and secondly, exhibits a plurality of cavities for silent discharge.

SUMMARY OF THE INVENTION

The electrically and thermally conductive, gas-permeable arrangement means that during forced cooling of the electrodes, the heat generated due to the discharge as well as due to the exothermic reaction of the atomic with the molecular oxygen will also be better conveyed in the gap between the electrode and the dielectric, since on the one hand, there is a direct thermally conductive connection between the electrode and the dielectric, and on the other, the area of heat transfer to the gas flowing through is substantially increased while the heat transfer path to all points inside the gap is reduced. Since ozone has a tendency to disintegrate again with increasing temperature so that a temperature-dependent equilibrium adjusts itself between the ozone content and the oxygen content, effective cooling can diminish the disintegration of ozone and improve the yield accordingly.

In contrast to a normal gap, which the gas containing oxygen and the generated ozone flow through in an almost laminar flow, a turbulent flow is forced in the gap, due to the electrically and thermally conductive, gas-permeable arrangement, with the consequence that the gas molecules arrive at the surface of the directly coolable electrodes again and again and therefore give off heat better.

Due to the materials used and the large number of electrode arrangements in a powerful ozone generator, such an ozone generator is extremely heavy which increases material and transport costs. Also, the behaviour in the event of a sparkover between the outer electrode and the inner electrode or the meshes thus connected in an electrically conductive manner is not ideal. A breakdown due to a puncture in the dielectric generally leads to a short circuit between the electrode rod and the heat exchanger tube acting as an outer electrode, which results in a shutdown of the entire ozone generator.

Proceeding from this prior art, the underlying problem of the invention is to improve the device of the type referred to above such that the overall weight of the device is reduced and its behaviour improved in the event of a breakdown.

This problem is solved by an electrode arrangement described herein.

Since in the electrode arrangement for an ozone generator with a tubular outer electrode, which concentrically encloses a tubular dielectric at a distance therefrom, wherein the dielectric concentrically encloses a rod at a distance therefrom, and wherein a filler material is provided in the interstice between the outer electrode and the dielectric and in the interstice between the dielectric and the rod, the rod is an insulator, the entire electrode arrangement can be designed to be lighter than in the prior art. In particular, in the event of a breakdown caused by puncture in the dielectric, the electrode arrangement can demonstrate intrinsically safe electrical behaviour since, during the breakdown, the substantially lighter inner electrode, which consists solely of the filler material, can evaporate without damaging the substantially higher-mass outer electrode. The ozone generator can generally remain in operation in spite of the breakdown.

Production is particularly easy if the rod is solid. The rod can also be hollow which further reduces the weight of the arrangement.

A particularly robust arrangement is produced if the rod is circular. However, a square rod can simplify production.

The rod is manufactured preferably from technical glass, for example, from DURAN or PYREX glass.

The filler material is made particularly of wire mesh, preferably made of stainless steel. However, netting or a woven fabric, a web-like fabric or an unstructured wire material can be used in simple applications.

A particularly compact design is achieved particularly if the filler material (5) in the interstice between the dielectric and the rod is provided with a direct connection to an electric power supply.

BRIEF DESCRIPTION OF THE DRAWINGS

An embodiment of the present invention is described below using the drawings.

DETAILED DESCRIPTION OF THE INVENTION

Figure 1:
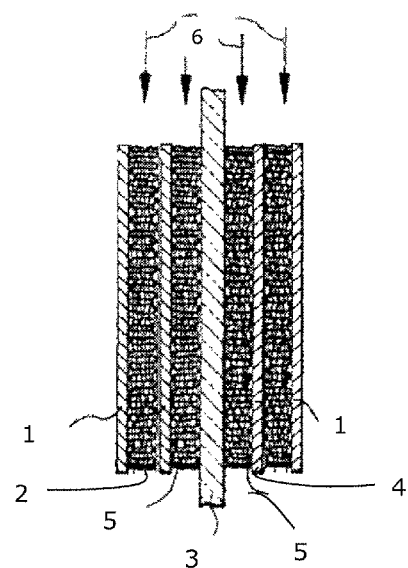
FIG. 1 shows a truncated longitudinal view of an electrode arrangement for an ozone generator.

FIG. 1 shows a truncated longitudinal view of an electrode arrangement for an ozone generator having a tubular outer electrode 1, an also tubular dielectric 2 and an internal rod 3. The arrangement has rotational symmetry. The outer electrode 1, the dielectric 2 and the rod 3 are arranged concentrically in relation to each other.

A knitted wire mesh 4 rests between the outer electrode 1 and the dielectric 2 filling the interstice. A knitted wire mesh 5 is provided accordingly between the dielectric 2 and the rod 3 which likewise fills the interstice there. The outer electrode 1 is formed in a known manner as a stainless steel tube and is cooled externally during operation. The mechanical configuration is designed such that the outer electrode 1 is part of a tube bundle heat exchanger, which has a plurality of electrode arrangements as per FIG. 1, around the outside of which cooling water circulates.

Likewise in a known manner, the dielectric 2 is a glass tube. The knitted wire meshes 4 and 5 are preferably made as so-called circular hollow cord also from a stainless steel wire mesh. These components are known from the generic prior art.

The rod 3 arranged in the centre of the electrode arrangement is an insulator as per invention, made, for example, from glass or another material compatible with oxygen and ozone. The rod 3 can, as shown in FIG. 1, be solid.

During operation, the electrode arrangement is exposed in a known manner to a feed gas containing oxygen which passes through the knitted wire mesh 4 and 5 in the direction of the arrows 6.

Figure 2:
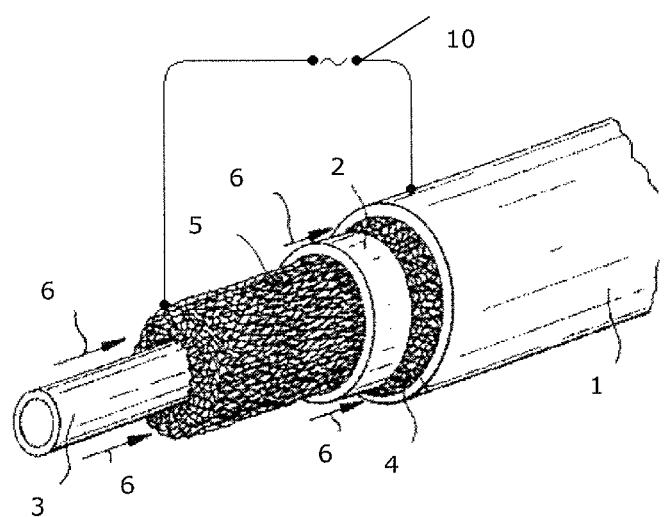
FIG. 2 shows a perspective view of the electrode arrangement from FIG. 1.

FIG. 2 shows the electrode arrangement from FIG. 1 in a schematic perspective view, wherein the individual components are shown pulled apart in an axial direction. As FIG. 2 shows, the rod 3 can also be configured as a tube, for example a glass tube.

An electric power supply 10 is schematically implied, which is in contact firstly with the outer electrode 1 and secondly, with the mesh 5. The operating voltage provided by the power supply 10 produces a silent electrical discharge in the cavities of the meshes 4 and 5, which generates ozone from the oxygen which passes through the meshes 4 and 5 in the direction of the arrows 6.

In the configuration shown in FIGS. 1 and 2, the inner electrode is formed solely by the mesh 5 while the rod 3 performs a supporting role as an insulator, guaranteeing the uniform filling of the interior of the dielectric with the knitted wire mesh 5. The rod 3 can also facilitate assembly of the knitted wire mesh 5 in the dielectric 2.

It appears that the rod 3 configured as an insulator has a plurality of advantages compared with the electrically conductive stainless steel central electrode known from the prior art, without having a negative effect on the electrical properties and, in particular, the level of effectiveness of the electrode arrangement in terms of ozone generation. The advantages of the rod 3 configured as an insulator consist firstly in the lighter weight. While the stainless steel that is conventionally used has a density of approx. 7,900 kg/m$^3$, the density of technical glass, which can be used for the rod 3, is specified as 2,230 kg/m$^3$. Due to the large number of electrodes in an efficient ozone generator, the overall weight is reduced accordingly.

The required electrically conductive surface for the barrier discharge used for ozone generation can be reduced to a minimum required size.

An important aspect consists in the mass ratio between the outer electrode 1 and the knitted wire mesh used as counter electrode 5. While the outer electrode is made of a stainless steel tube weighing approx. 350 g per meter, the counter electrode is made of stainless steel wire with a wire diameter of approx. 0.2 mm and weighing just approx. 12 g per meter. The knitted wire mesh 5 is therefore considerably lighter than the outer electrode 1. The thermal capacity, melting temperature and melting energy of the materials used for the outer electrode 1 and for the knitted wire mesh 5 are more or less the same. The rod 3 is not involved in electrical processes in the event of a breakdown and can be disregarded in this respect.

This means that in the event of an insulation error, which may arise as a result of a puncture in the dielectric 2 due to mechanical stress, the electrode arrangement will demonstrate intrinsically safe behaviour. If there is a short circuit between the outer electrode 1 and the knitted wire mesh 5, then the knitted wire mesh 5 will be evaporated by the sparkover on account of the mass ratio described above until a sufficiently large distance between the knitted wire mesh 5 and the outer electrode 1 is re-established. The outer electrode 1 will not be damaged or adversely affected in the process due to its substantially greater mass. The damaged electrode can therefore remain in the ozone generator and does not need to be replaced immediately. This intrinsically safe behaviour cannot be achieved if a metallic conductor is used as the central rod 3 and thus as a counter electrode in the centre of the electrode arrangement.

Technical glass is the primary material used for the rod 3 which can be configured as a solid circular rod, a solid square rod or as a tube. The other components of the electrode arrangement correspond to the generic prior art described above, wherein the power supply 10 contacts directly on the mesh while in the prior art contact can be made at the central electrode.

REFERENCE SIGNS

1. Outer electrode
2. Dielectric
3. Rod
4. Knitted wire mesh
5. Knitted wire mesh
6. Flow direction
10. Electrical power supply

What is claimed is:

1. An electrode arrangement for an ozone generator comprising a tubular dielectric which concentrically encloses a rod at a distance therefrom, and a filler material provided in an interstice between the tubular dielectric and the rod, wherein the rod is an insulator and the filler material forms an electrode.

2. The electrode arrangement according to claim 1, wherein the rod is solid.

3. The electrode arrangement according to claim 1, wherein the rod is hollow.

4. The electrode arrangement according to claim 1, wherein the rod is made of glass.

5. The electrode arrangement according to claim 1, wherein the rod is made of a material that is compatible with oxygen and ozone.

6. The electrode arrangement according to claim 1, wherein the rod is circular.

7. The electrode arrangement according to claim 1, wherein the rod is arranged in a center of the electrode arrangement.

8. The electrode arrangement according to claim 1, wherein the filler material comprises a mesh.

9. The electrode arrangement according to claim 1, wherein the filler material comprises a knitted mesh.

10. The electrode arrangement according to claim 1, wherein the filler material comprises a knitted wire mesh.

11. The electrode arrangement according to claim 1, wherein the filler material is conductive.

12. The electrode arrangement according to claim 1, wherein the filler material is provided with a connection for an electrical power supply.

* * * * *